United States Patent
Kao et al.

(10) Patent No.: US 6,392,686 B1
(45) Date of Patent: May 21, 2002

(54) MULTIPURPOSE COMMUNICATION DEVICE

(75) Inventors: Wen-Lung Kao; Yuh-Feng Yang; Yih-Chyun Juang; Jao-Yen Wei, all of Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/337,896

(22) Filed: Jun. 21, 1999

(51) Int. Cl.⁷ .................. H04N 7/14; H04M 11/00
(52) U.S. Cl. .............. 348/14.01; 348/14.05; 379/93.21; 709/204
(58) Field of Search ............ 348/14.01–14.12, 348/460–461, 552–553; 379/1.01, 93.01, 93.15, 93.19, 93.21, 93.23, 202; 709/204–205, 214, 227–228; 370/260, 261; 345/750–751, 753; 725/106, 114, 131–133

(56) References Cited

U.S. PATENT DOCUMENTS

| | | | |
|---|---|---|---|
| 5,206,934 A | * 4/1993 | Naef, III | 709/204 |
| 5,369,704 A | * 11/1994 | Bennett et al. | 348/14.08 |
| 5,490,208 A | * 2/1996 | Remillard | 379/93.19 |
| 5,675,375 A | * 10/1997 | Riffee | 348/14.1 |
| 5,881,128 A | * 3/1999 | Lee | 379/1.01 |
| 6,205,209 B1 | * 3/2001 | Goldberg et al. | 379/93.21 |

* cited by examiner

*Primary Examiner*—Curtis Kuntz
*Assistant Examiner*—George Eng
(74) *Attorney, Agent, or Firm*—Ya-Chiao Chang, Esq.

(57) ABSTRACT

A multipurpose communication device for use with a video display device and an input device to transmit data to a remote multipurpose communication device of another user through a telephone line, or to receive data from a remote multipurpose communication device. The multipurpose communication device is capable of determining if the remote multipurpose communication device of the remote party is of the same type, and capable of calling a corresponding application program when receiving a communication from the remote party, so that the transmitting data can be dispatched and received by different application programs.

6 Claims, 10 Drawing Sheets

MULTIPURPOSE COMMUNICATION DEVICE

FIELD OF THE INVENTION

The invention relates to a communication device, and more particularly, to a multipurpose communication device that allows two or more users to communicate with one another by image. The communication includes the delivery of text.

BACKGROUND OF THE INVENTION

A popular method for communication by image is the use of fax or electronic mail (e-mail) via the Internet. However, using a computer or fax machine for remote communications is acceptable only to particular groups of people, e.g., ones who are familiar with computers, or those willing to regularly upgrade their computer hardware and software. Further, there are many people who rarely use fax machines. Consequently, it is not practical to ask people to purchase a computer or a fax machine that is not frequently used for communication.

The television set is one of the most popular home appliances. Furthermore, because cable television (cable TV) has become more popular and two-way cable television has been developed, television functions have changed. Therefore, there is a demand in the art to provide a multipurpose communication device for use with television sets and cable TV.

SUMMARY OF THE INVENTION

It is an object of the invention to provide a multipurpose communication device for use with a television set which can easily be installed without affecting the functions of the television set. It is another object of the invention to provide a multipurpose communication device that is capable of determining whether the remote party in communication uses the same structure as the multipurpose communication device. It is a further object of the invention to provide a multipurpose communication device that is also capable of calling corresponding application program, for example, on-line conversation or fax application programs from the application programs stored therein when receiving a communication transmission from the remote party.

To achieve the aforesaid and other objects of the invention, a multipurpose communication device is designed to be used with a video display device (for example, a television set) and an input device. Television signals are transmitted to the multipurpose communication device through a transmission line, then processed by the multipurpose communication device and transmitted to the video display device. The user can input data signals of text or instructions to the multipurpose communication device. The multipurpose communication device can deliver input data to a remote multipurpose communication device of another user through a telephone line, or receive data transmitted from a remote multipurpose communication device of another user. Through the video display device, the user can deliver data and manage transmitted data. The multipurpose communication device comprises a processor, a memory, a data storage device, a voice processing unit, and a modem. The multipurpose communication device further comprises a video-processing unit. The video-processing unit comprises a tuner, a video encoder, and a video control. The tuner is provided for selecting the desired TV channel. The video control synthesizes text or graphics data produced by a software program, and then sends synthesized data to the video encoder for encoding into signals readable by the video display device. The signals are then output from the video encoder to the video display device for display.

DETAILED DESCRIPTION

Figure 1:
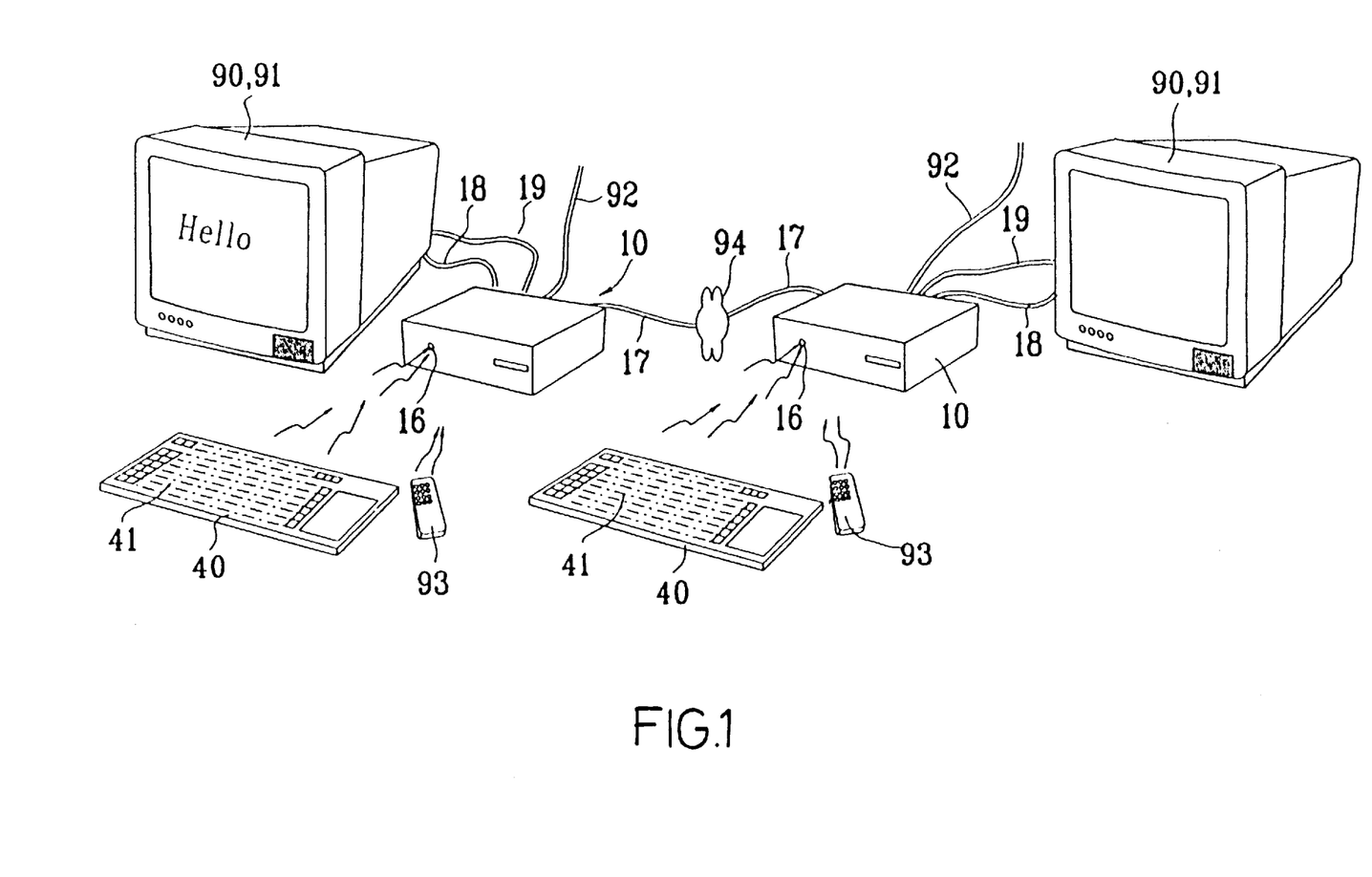
FIG. 1 is a schematic diagram showering a multipurpose communication device according to the invention used with a video display device and an input device.

Referring to FIG. 1, a multipurpose communication device is designed for use with a video display device 90, and an input device 40. The video display device 90 can be, for example, a TV set 91. A transmission line (for example, a TV cable) 92 is connected to the communication device 10, which is in turn connected to the TV set through an audio signal transmission line 18 and a video signal transmission line 19, thereby enabling audio and video signals to be transmitted to the TV set 91. Alternatively, a TV cable may be used to replace the audio and video signal transmission lines 18,19 for transmitting audio and video signals from the communication device 10 to the TV set 91.

The application of the communication device 10 is outlined hereinafter. When watching TV, the user can use a remote controller 93 to control the communication device 10, causing it to tune in the TV set 91 for selecting a desired TV channel. For communication with a remote party, the user can input command to the communication device 10 through the key switches 41 of the input device 40, causing the communication device 10 to run a particular application program, so as to make a communication with another TV user at a remote place through a telecommunication network 94. The application program can be, for example, fax software for transmitting data to a remote fax machine 96 (not shown).

Figure 2:
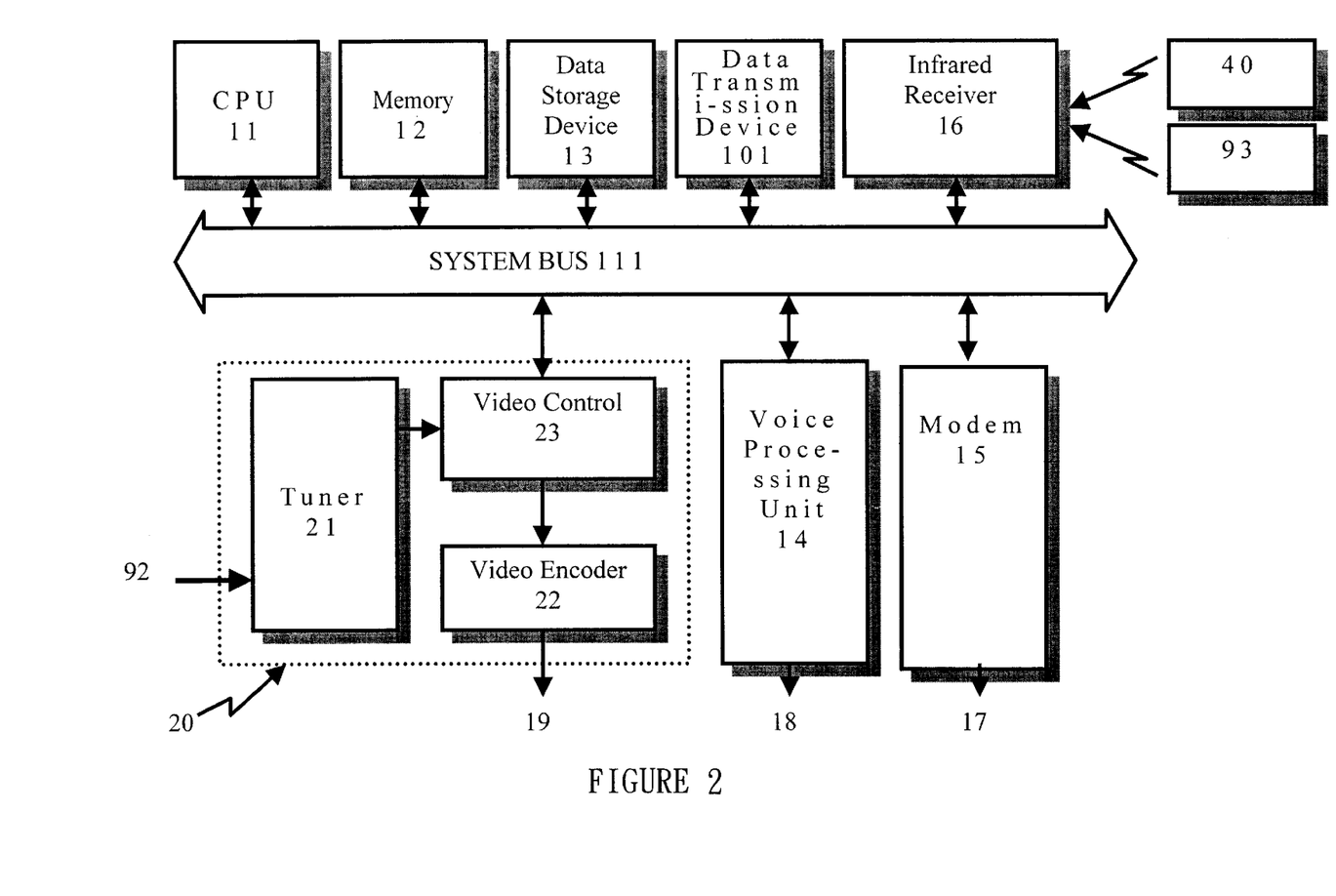
FIG. 2 is a block diagram showing the hardware architecture of the multipurpose communication device according to the invention.

The hardware architecture of the aforesaid communication device 10 is shown in FIG. 2. Similar to a standard computer, the communication device 10 comprises a data transmission device 101 (for example, a floppy disk drive), a CPU (central processing unit) 11, a system bus 111, a memory 12, a data storage device 13 (hard disk drive, chip type memory or disk type memory), a voice processing unit 14, and a modem 15. A person skilled in the art can easily achieve this hardware architecture. The hardware architecture of the communication device 10 is similar to a standard personal computer with the exception of the video-processing unit 20. The video-processing unit 20 comprises a tuner 21, a video encoder 22, and a video control 23. TV signal is transmitted through the TV cable 92 to the tuner 21, enabling the remote controller 93 to select the desired TV channel.

The video control 23 synthesizes text or graphics data produced by the running of the internal software program, and then sends synthesized data to the video encoder 22 for encoding into a signal readable by the TV set 91. The signal is then output from the video encoder 22 to the TV set 91 through the video transmission line 19. A regular TV signal is an analog signal, and the TV set 91 is capable of receiving an analog signal. Therefore, the video control 23 and the video encoder 22 can be obtained from chips of IGS's CyberPro series.

When the user watches the TV set 91 without using the fax function, the CPU 11 can control the video control 23 to transmit data, enabling the TV signal to be by-passed to the video transmission line 19. When the user uses the fax function, the video control 23 handles the TV signal, and the text or graphics picture (operating window or preview of data to be sent through the fax function) produced by the communication device 10. If TV signal at this stage is an analog signal, it must be converted into a digital signal, so that the TV signal can be synthesized with the text or graphics picture.

The audio signal, which is carried in the TV signal, is transmitted to the voice processing unit 14 through the video control 23 via the system bus 111 (see FIG. 2).

The modem 15 can be externally connected to the communication device 10, or built in the communication device 10. When the former arrangement is adopted, a RS232 connector may be provided at the communication device 10 for receiving the modem 15, which is the most popularly accepted type available in the market.

A wireless communication method, for example, an infrared signal transmission method is recommended for communication between the input device 40 and the communication device 10. In order to achieve infrared signal transmission between the input device 40 and the communication device 10, an infrared receiver 16 is installed in the communication device 10 to receive infrared signals from the input device 40. Alternatively, radio wave or wired signal transmission method can achieve transmission of input signals.

Figure 3:
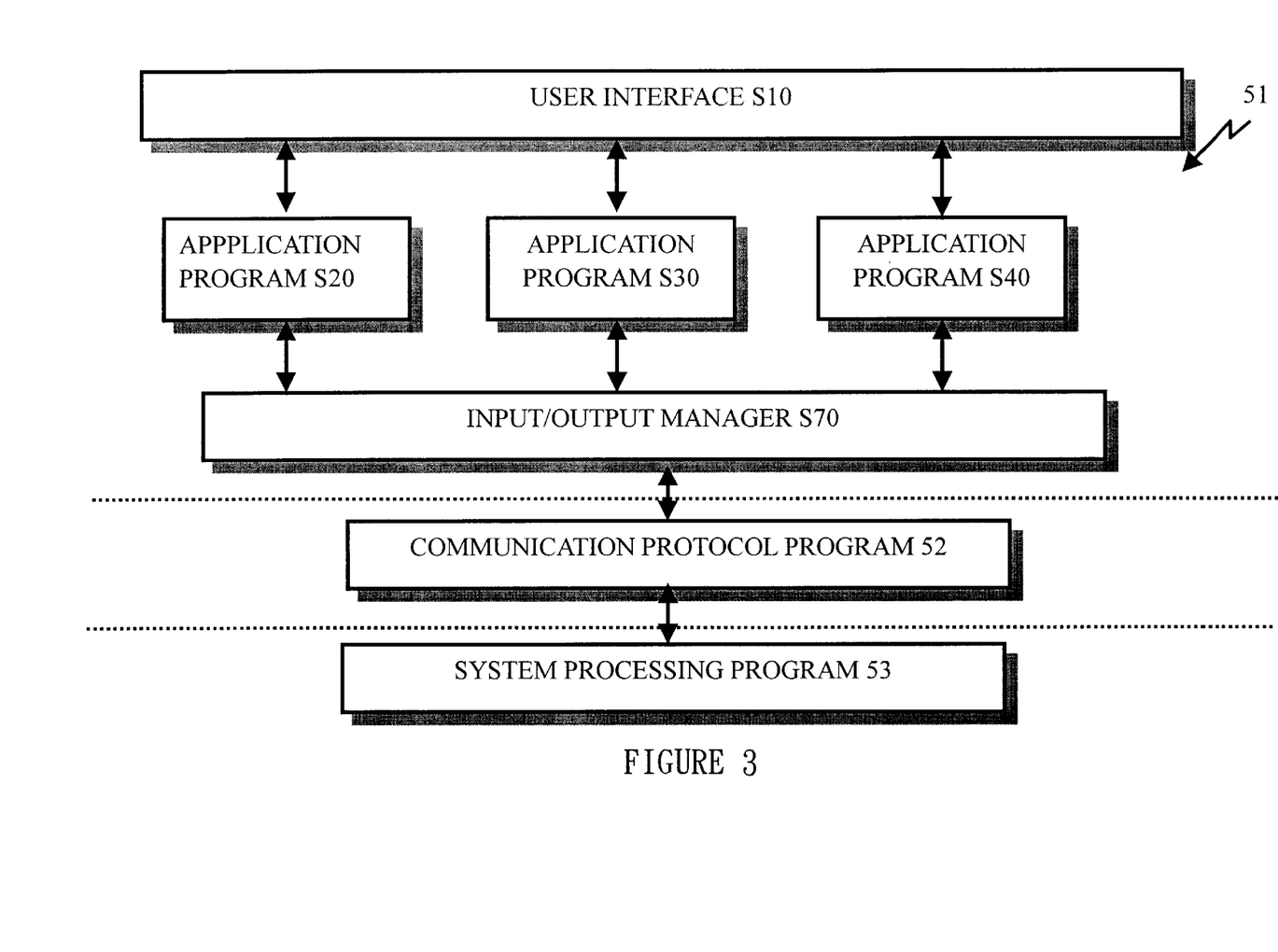
FIG. 3 illustrates the software architecture of the multipurpose communication device according to the invention.
Figure 4:
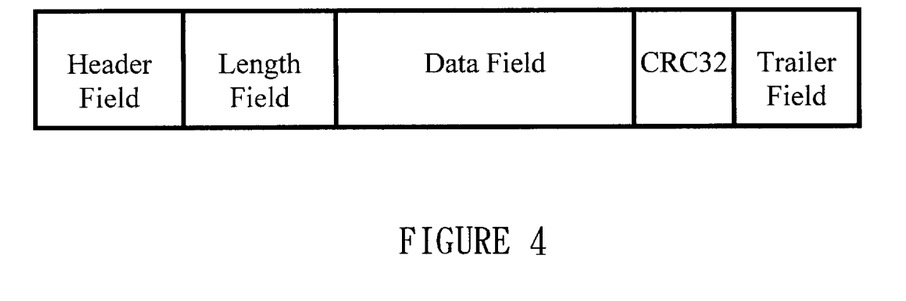
FIG. 4 illustrates the packet format of a communication protocol recommended for the multipurpose communication device according to the invention.

The software architecture of the invention is outlined hereinafter with reference to FIG. 3. The software architecture comprises three layers, namely, the application programs 51 at the top, the communication protocol program 52 on the middle, and the system processing program 53 at the bottom. The system-processing program 53 is not within the scope of the invention; therefore, it is not described in detail. The packet format shown in FIG. 4 is recommended for the communication protocol program 52. In the packet format shown in FIG. 4, the header field represents the start end of the packet, and is recommended to occupy one bit the length field defines the length of the data of the packet, and is recommended occupy two bits; the data field contains the transmitting message, and recommended to occupy 1024~2048 bits; CRC32 field is an error detection/correction code field; the trailer field represents the end of the packet. Because the communication is achieved through a communication network, the object ID and source ID which are imperative in TCP/IP in the Internet are not necessary in the invention.

Figure 5:
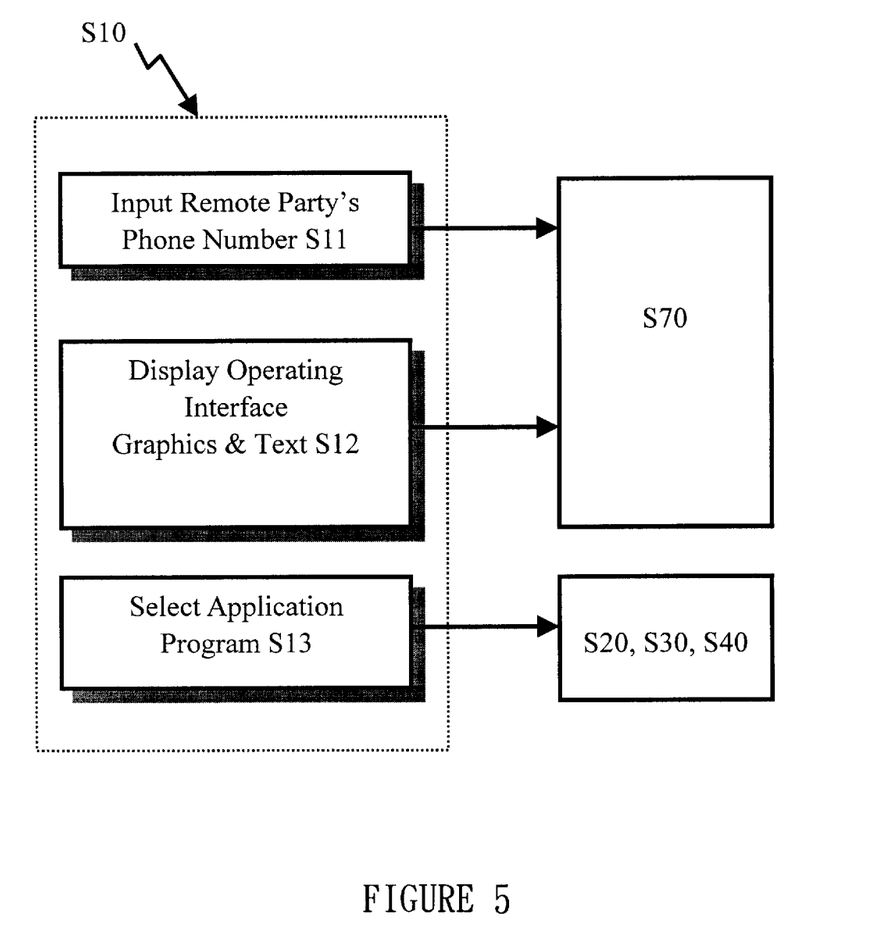
FIG. 5 is a block diagram showing the software architecture of the user's interface according to the invention.

Referring to FIG. 5 and FIGS. from 1 through 4 again, the user's interface S10 enables the user to operate the device subject to indications, and provides three functions. The function of "input the telephone number of the remote party to be communicated S11" is the requisite measure to set up a link with the remote party. The user provides the function of "displaying operating interface graphics and text S12" preferably in the form of a window to facilitate the operation of the software. The function of "selecting application program S13" enables the user to select a different application program S20, S30 or S40. Because the graphics or menu design of the user's interface S10 is not within the scope of the invention, it is not described in detail.

The application program S20, S30 or S40 provides a particular function, for example, fax function, on-line talk function, mailing function, or draft communication function.

Figure 6:
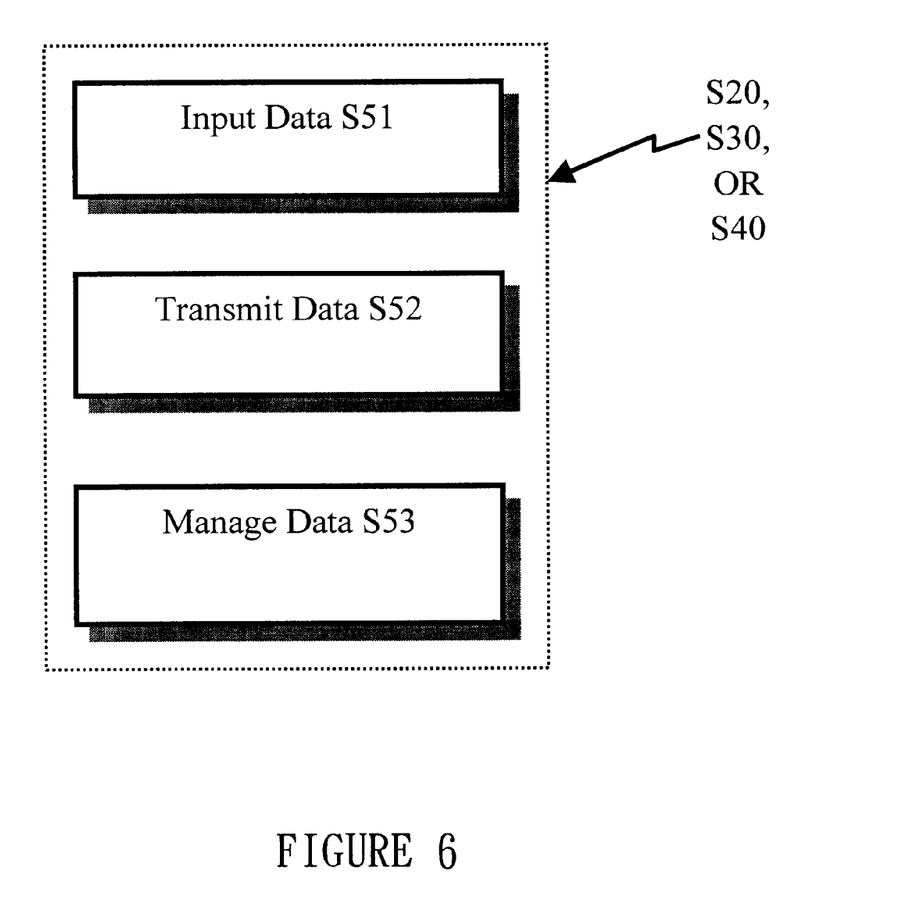
FIG. 6 is a block diagram showing the software architecture of an application program according to the invention.
Figure 7:
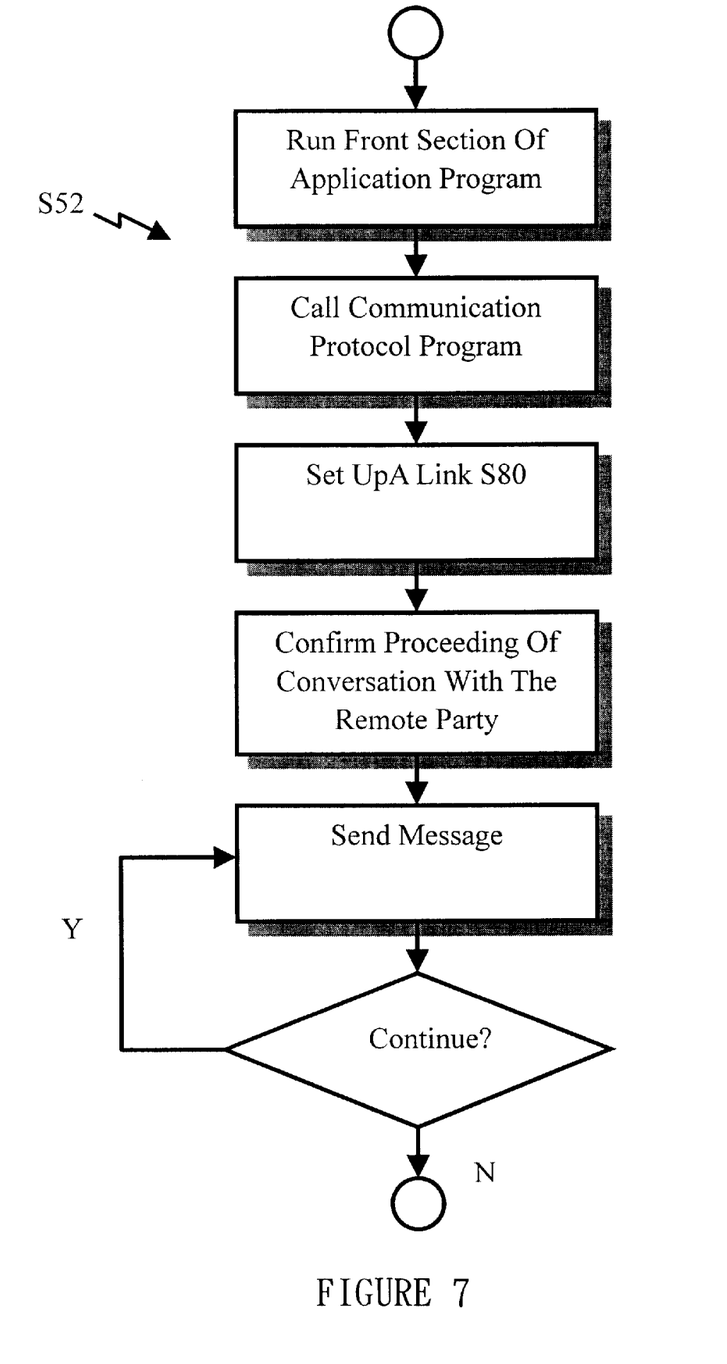
FIG. 7 is a flow chart showing the procedure of transmitting data of the application program according to the invention.

FIG. 6 is a block diagram showing the software architecture of the application program S20, S30 or S40. It includes three parts, namely, the first part of "input data S51", the second part of "transmit data S52", and the third part of "manage data S53". The first part of "inputting data S51" is to input the data to be transmitted. The input device 40 can be used to input text or graphics data. Alternatively, prepared data can be stored in the data storage device 13 through the data transmission device 101. At the second part of "transmitting data S52", as shown in FIG. 7, it first runs the front section of the application program, for example, completes data input S51, or completes required input instruction and then calls the communication protocol program 52 subject to the nature of the application program. When the remote party uses same communication device 10, it is necessary to call the communication protocol program 52. If the application program is fax software, it is necessary to call the communication protocol program 52 when sending a fax message to another multipurpose communication device 10. On the contrary, it is not necessary to call the communication protocol program 52 when sending a fax message to a standard fax machine 96. After calling of the communication protocol program, it proceeds to the step of setting up a link S80 (this will be described later), i.e., to make handshaking. After setting of the link, it decides if to "confirm proceeding of conversation with the remote party". The decision is made subject to the nature of the application program used. If the application program is an on-line conversational program, it is necessary to wait for an acknowledgement of proceeding a conversation from the remote party. If the application program used is a mailing program, it is not necessary to "confirm proceeding of conversation with the remote party". After confirmation, it proceeds to the next step of "sending message". It ends the program when all data has been sent out.

Figure 8:
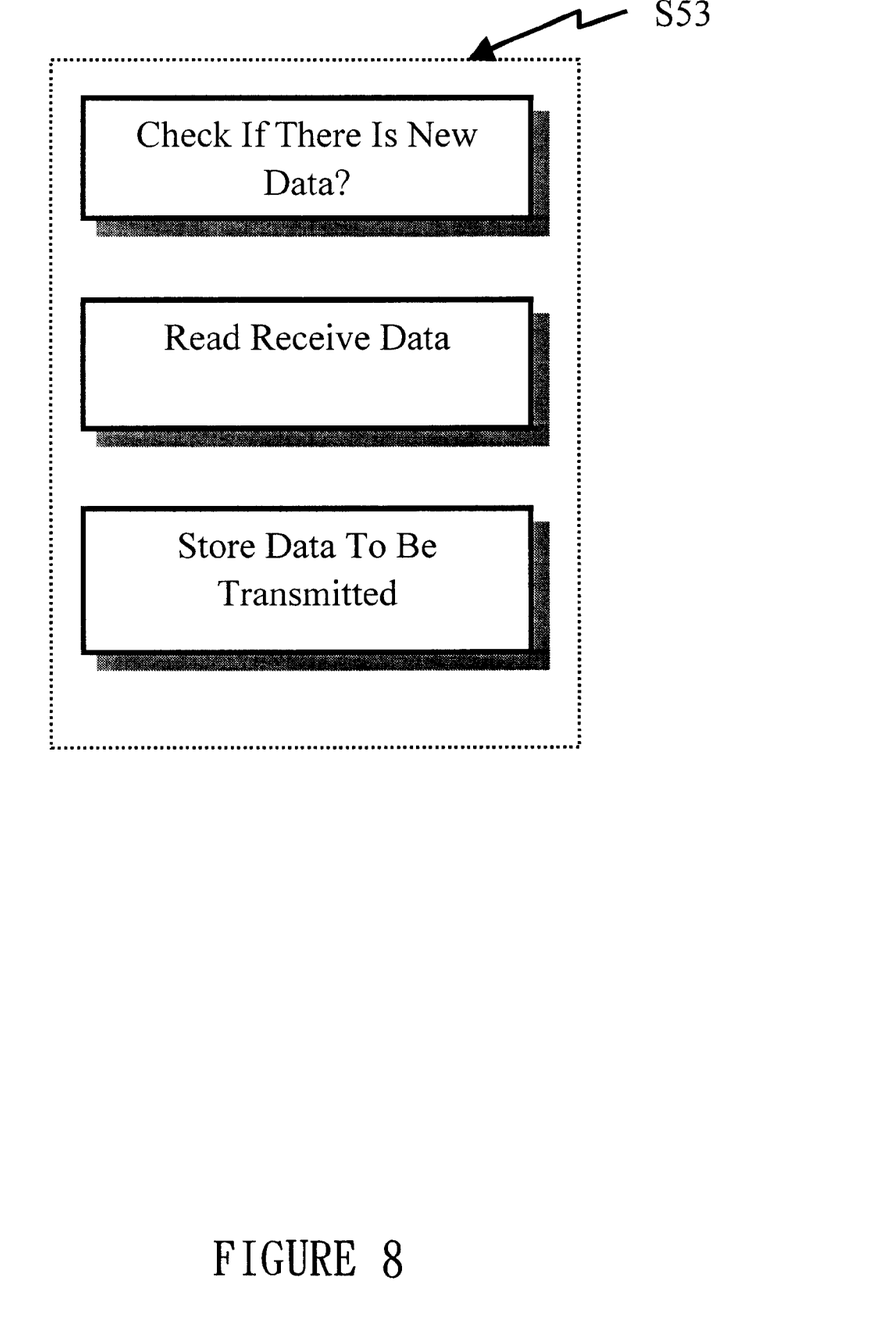
FIG. 8 is a block diagram indicating the architecture of managing data of the application program according to the invention

FIG. 8 is a block diagram indicating the software architecture of the part of "managing data S53" of the application program. This software architecture includes three parts, namely. "check if there is new data"; "read received data", and "store data to be transmitted".

Figure 9:
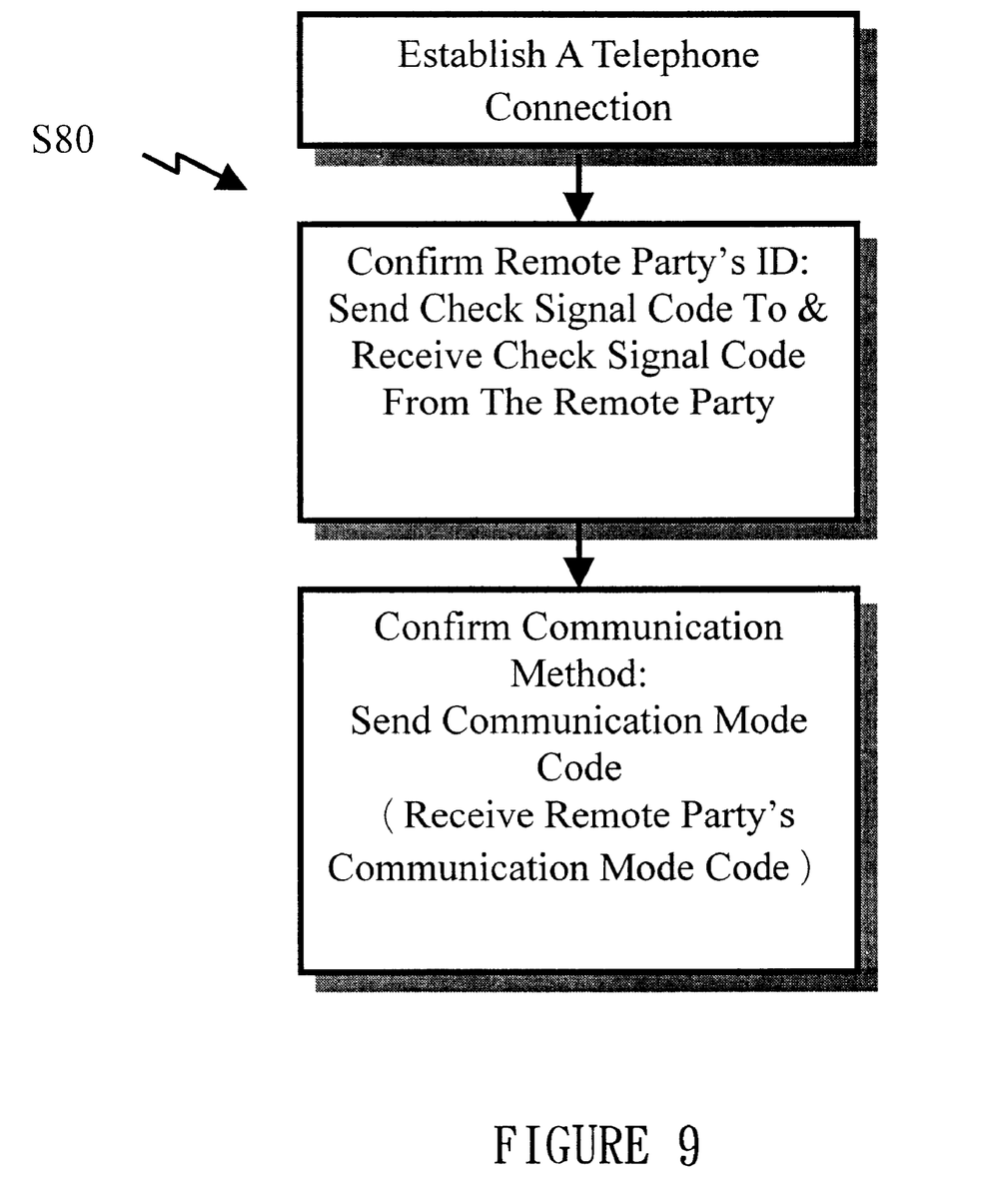
FIG. 9 is a flow chart explaining the procedure of setting up a link of the application program according to the invention.

FIG. 9 is a software flow chart explaining the procedure of setting up a line S53. This procedure includes the step of dialing a telephone number to establish a telephone connection (the telephone number can be input through the input device 40), and the step of sending a check signal code to the remote party and receiving a check signal code from the remote partly so as to identify that the remote party uses a multipurpose communication device 10. The check signal code can be set as "TV-AID for identification of a multipurpose communication device 10. Further, it is necessary to send the code of communication mode of one's own side, so that the device 10 of the remote party knows which application program should be called. For example, if the application program is an on-line conversational program, the corresponding code of communication mode can be online. If the application program is a mailing program, the corresponding code of communication mode can be "Mailing". When the remote party initiates a communication, the code of communication mode from the remote party is received, so that the communication device 10 of one's own side knows which application program should be called.

Figure 10:
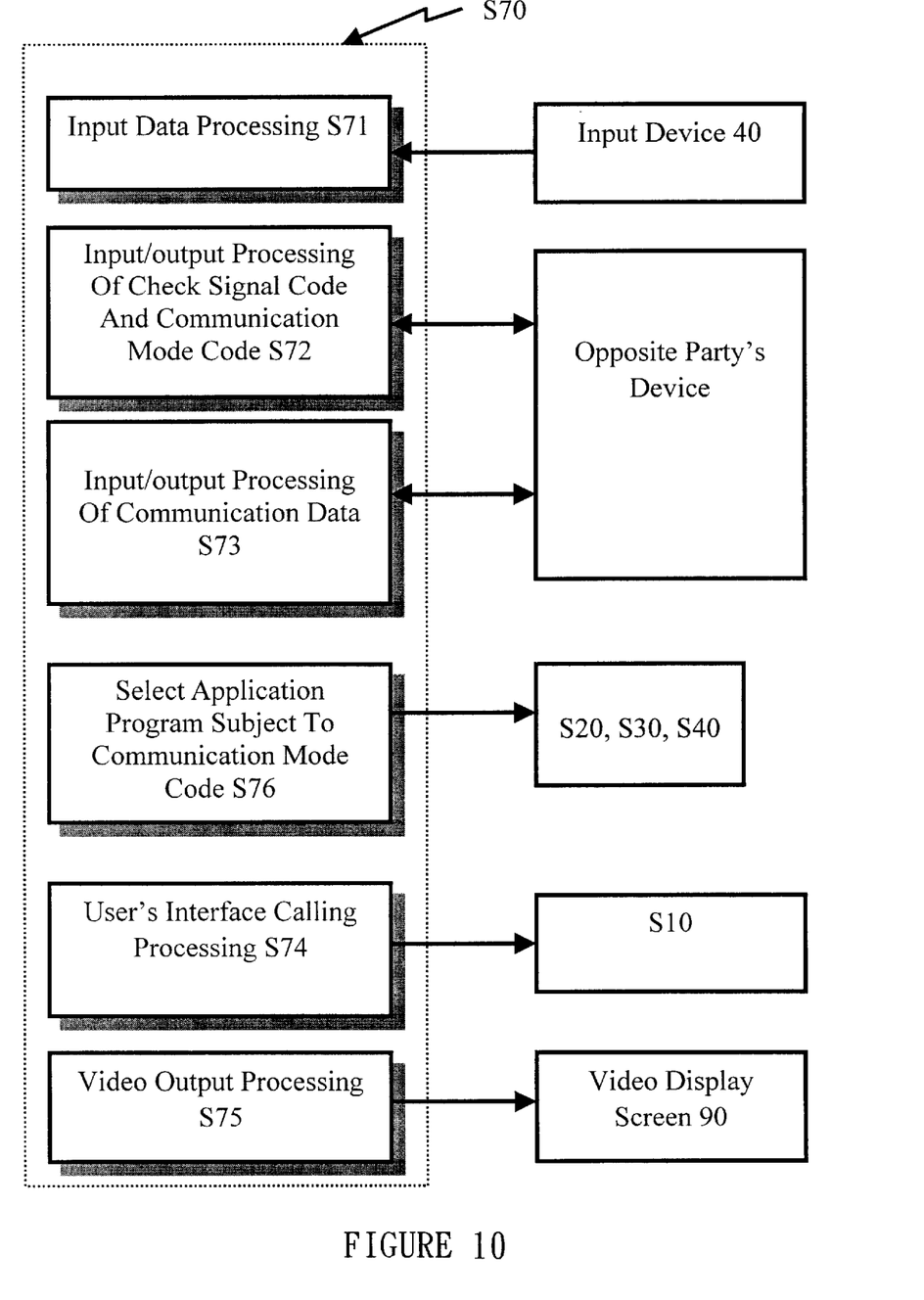
FIG. 10 is a block diagram illustrating the software architecture of the input/output manager according to the invention.
Figure 11:
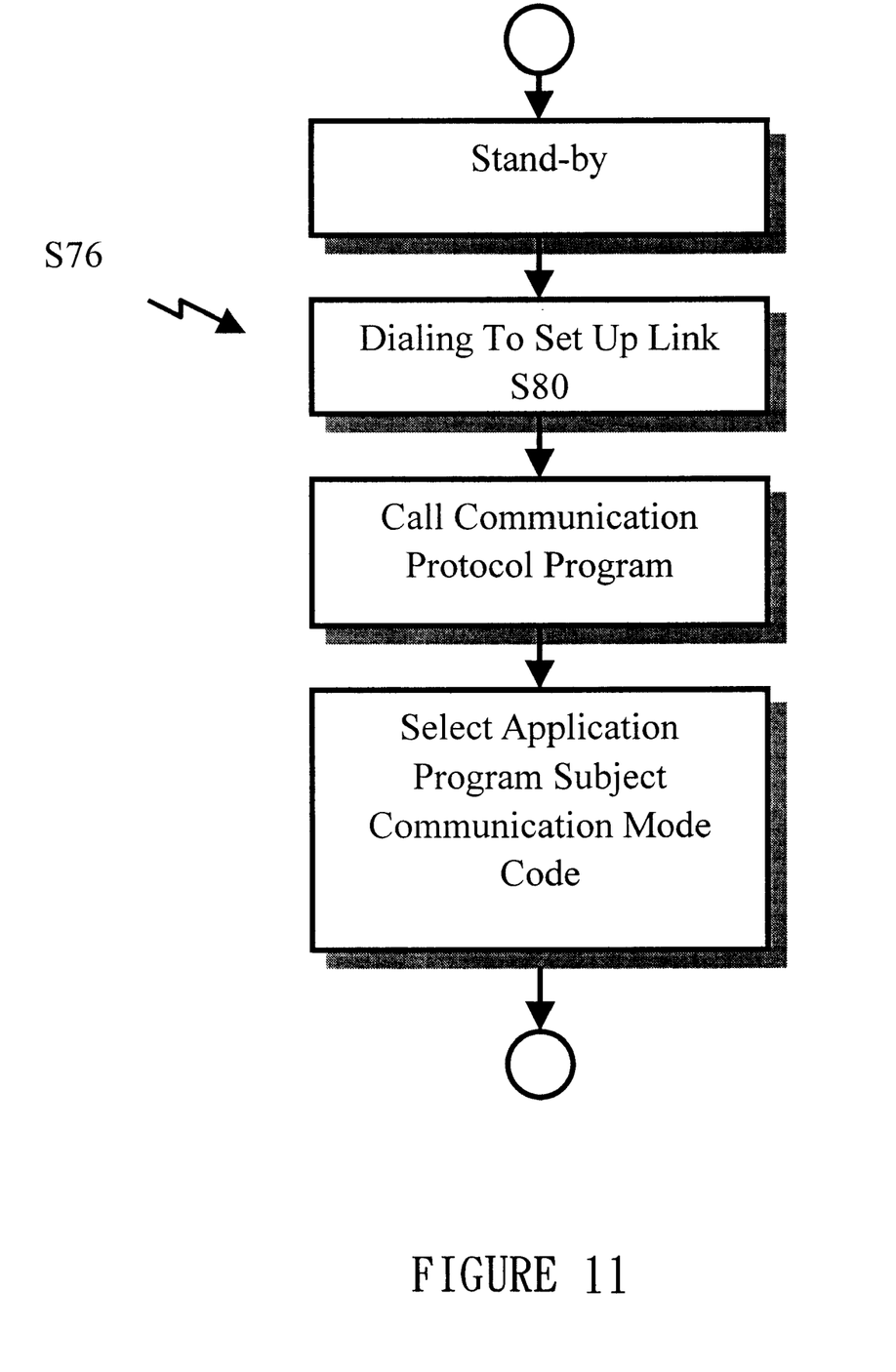
FIG. 11 is an operational flow chart explaining the operation of selecting application program subject to the code of communication mode according to the invention.

The input/output manager S70 manages input and output of the aforesaid data or message. FIG. 10 illustrates the software architecture of the input/output manager S70. As illustrated, the software architecture of the input/output manager S70 provides five main functions. The "Input data processing S71" is to process inputted data, including instructions, from the input device 40. The "Input/output processing of check signal code and communication mode code S72" has a concern with the step of setting up a link S80, and is to select a proper application program. The "Input/output processing of communication data S73" is to output communication data to the communication device at the remote party, or to receive communication data from the remote party. The "User's interface calling processing S74" is to start the user's interface S10 when the remote party sends a communication data, for example, to display an attention sign (letter or pattern) on the screen of the TV set 91. The "Video output processing" is to process picture to be displayed on the video display screen 90. The process of "selecting application program subject to the communication mode code S76" is explained in FIG. 11. If a communication signal comes from a remote communication device 10 when the communication at one's own side is at the stand-by mode to wait for input data, it proceeds to the step of dialing to set up a link S80, then proceeds to the step of calling a communication protocol program, and then proceeds to the step of selecting an application program subject to the code of the communication mode received.

It is to be understood that the drawings are designed for purposes of illustration only, and are not intended for use as a definition of the limits and scope of the invention disclosed.

What is claimed is:

1. A multipurpose communication device for use with a video display device and an input device to process a video signal from a transmission line connected thereto and to send processed video signal to the video display device, the multipurpose communication device having multiple application programs stored therein, said application programs being selectable by a first user who inputs instruction into said multipurpose communication device through the input device, enabling said multipurpose communication device to selectively transmit data to a second multipurpose communication device operated by a second user at a remote location through a telephone line, and to receive data transmitted by the second multipurpose communication device for display through the video display device, the multipurpose communication device comprising:

input data receiver means for receiving data signal input through the input device;

receiving and outputting means for receiving data signal transmitted from the telephone line, and outputting data signal to the telephone line;

first memory means for storing application program means readable by said multipurpose communication device, thereby enabling the first user to use said application program means to accept data and to deliver data;

second memory means for storing data and application program means, and holding stored data and application program means when said multipurpose communication device is not supplied with power;

processor means for processing and controlling data signal in said multipurpose communication device, and running the application program means in said first memory means to determine if said second multipurpose communication device which is used by said second user is of the same structure as said first multipurpose communication device, and to call the corresponding application program means from said application program means when receiving a signal from said second multipurpose communication device, which is used by said second users and of the same structure as said first multipurpose communication device; and video processing means for receiving television signal, selecting television channels, processing text and graphics data produced from said application program means and outputting processed text and graphics signal to said video display device for display wherein said processor means dispatches a check signal code representing said multipurpose communication device and a code of application program communication mode to said second multipurpose communication device when said second multipurpose communication device is operated by said second user to set up a link with said multipurpose communication device, so as to determine if said second multipurpose communication device is of the same structure of said multipurpose communication device, and to call the corresponding application program from said application program means.

2. The multipurpose communication device of claim 1 further comprising data transmission means for transmitting data to said multipurpose communication device.

3. The multipurpose communication device of claim 1 wherein said video processing means converts analog signal into digital signal when said television signal is of analog form.

4. The multipurpose communication device of claim 1 wherein said first memory means is readable and write memory.

5. The multipurpose communication device of claim 1 wherein said second memory means is a hard disk drive.

6. The multipurpose communication device of claim 1 wherein said receiving and outputting means comprises a modem.

* * * * *